(12) United States Patent
Moyal et al.

(10) Patent No.: US 7,501,803 B1
(45) Date of Patent: Mar. 10, 2009

(54) SYNCHRONIZED BOOST SIGNAL APPARATUS AND METHOD

(75) Inventors: Nathan Moyal, West Linn, OR (US); Brent Jensen, Hillsboro, OR (US)

(73) Assignee: Cypress Semiconductor Corporation, San Jose, CA (US)

( * ) Notice: Subject to any disclaimer, the term of this patent is extended or adjusted under 35 U.S.C. 154(b) by 233 days.

(21) Appl. No.: 11/524,615

(22) Filed: Sep. 20, 2006

Related U.S. Application Data

(60) Provisional application No. 60/720,168, filed on Sep. 22, 2005.

(51) Int. Cl.
 *G05F 1/00* (2006.01)
(52) U.S. Cl. ...................... 323/268; 323/222
(58) Field of Classification Search .............. 323/268, 323/222, 266; 363/59, 60; 365/226, 227
 See application file for complete search history.

(56) References Cited

U.S. PATENT DOCUMENTS 5,903,197 A * 5/1999 Kikugawa .................... 331/17
6,909,264 B2 * 6/2005 Del Gatto et al. ........... 323/268

OTHER PUBLICATIONS

*WirelessUSB™ LP 2.4GHz Radio SoC*, Cypress Perform, Cypress Semiconductor Corporation, Jul. 18, 2006, 39 Pages.
*DC-DC Converter Tutorial*, Dallas Semiconductor Maxim, Oct. 19, 2000, 13 Pages.

* cited by examiner

*Primary Examiner*—Vu A Le
(74) *Attorney, Agent, or Firm*—Blakely, Sokoloff, Taylor & Zafman LLP

(57) ABSTRACT

A method and apparatus to synchronize a boost signal. The apparatus includes a boost circuit and a synchronization circuit. The synchronization circuit is coupled to the boost circuit. The boost circuit generates an unsynchronized boost signal to boost a voltage signal from a first voltage to a second voltage. The synchronization circuit synchronizes the unsynchronized boost signal with a reference signal to generate a synchronized boost signal.

19 Claims, 8 Drawing Sheets

SYNCHRONIZED BOOST SIGNAL APPARATUS AND METHOD

RELATED APPLICATIONS

This application claims the benefit of U.S. Provisional Application No. 60/720,168 filed on Sep. 22, 2005.

TECHNICAL FIELD

This invention relates to the field of boost circuits and, in particular, to synchronizing a boost signal with a reference signal.

BACKGROUND

In certain applications, the supply voltage for a circuit may be boosted from a low voltage to a higher voltage. Boosting voltages is applicable in many applications, including battery-powered devices. In particular, boosting voltages is applicable when legacy components are incorporated into new devices which would otherwise (i.e., without the legacy components) operate on less power. For example, a battery-powered device may include a battery pack which supplies approximately 1.8 Volts and legacy components which operate on approximately 2.4 Volts. In this case, the power would need to be boosted, or increased, from 1.8 Volts to 2.4 Volts in order to operate the legacy components.

FIG. 1 illustrates a conventional boost system 10. The depicted boost system 10 includes a chip 12 and a boost circuit 14. Power is supplied to the chip 12, for example, from a battery pack (not shown). Components that operate on the supplied voltage may receive power directly from the battery pack. However, components that operate on a higher voltage than the voltage supplied by the battery pack receive a boosted voltage signal from the boost circuit 14.

FIG. 2 illustrates a conventional boost system timing diagram 20. The depicted timing diagram 20 shows the voltage signal periodically dropping to a threshold voltage, $V_{TH}$, and then being boosted to a boost voltage, $V_B$. The voltage signal is boosted each time the boost circuit 14 generates a boost signal. For example, the boost circuit 14 generates boost signals at times t0, t1, t2, and t3. However, these boost signals are not synchronized with the reference signal, REF. Because the boost signals are not synchronized, some of the boost signals may occur, and the voltage signal may be boosted, at approximately the same time as a rising edge of the reference signal. For example, the boost signal at time t1 occurs at the same time as a rising edge of the reference signal. This occurrence can have negative effects because boosting the voltage signal is typically a noisy process—sharp and deterministic supply spikes may interrupt the operation of certain components on the chip 12.

The conventional solution to the noise generated during the boosting process is to design internal circuitry on the chip 12 so that it is robust and immune to the noise. As a result, additional design headroom and circuitry (e.g., an internal supply regulator) may be incorporated into the chip 12. However, these measures typically increase the cost of the chip 12.

BRIEF DESCRIPTION OF THE DRAWINGS

The present invention is illustrated by way of example, and not by way of limitation, in the figures of the accompanying drawings.

DETAILED DESCRIPTION

Figure 1:
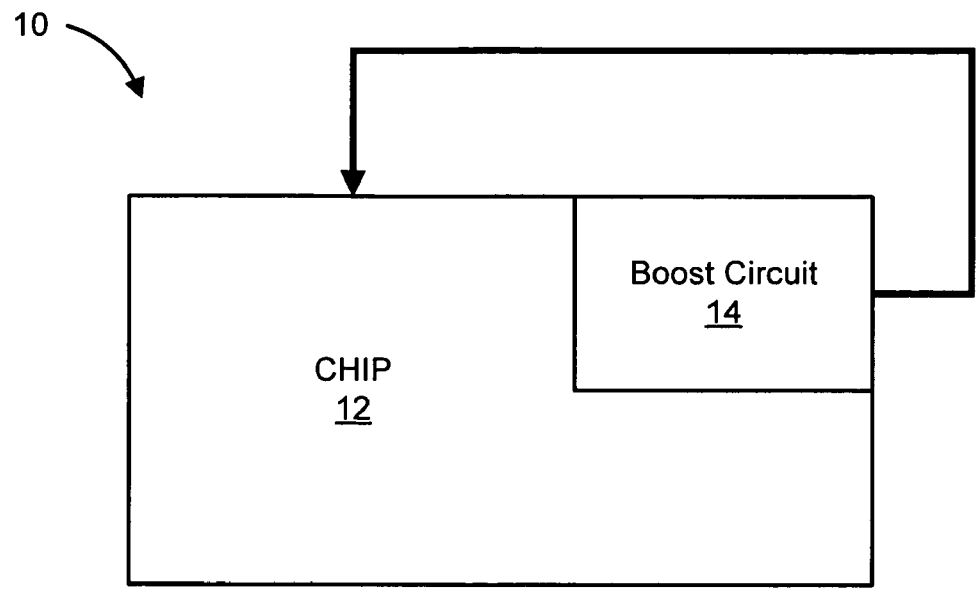
FIG. 1 illustrates a conventional boost system.
Figure 2:
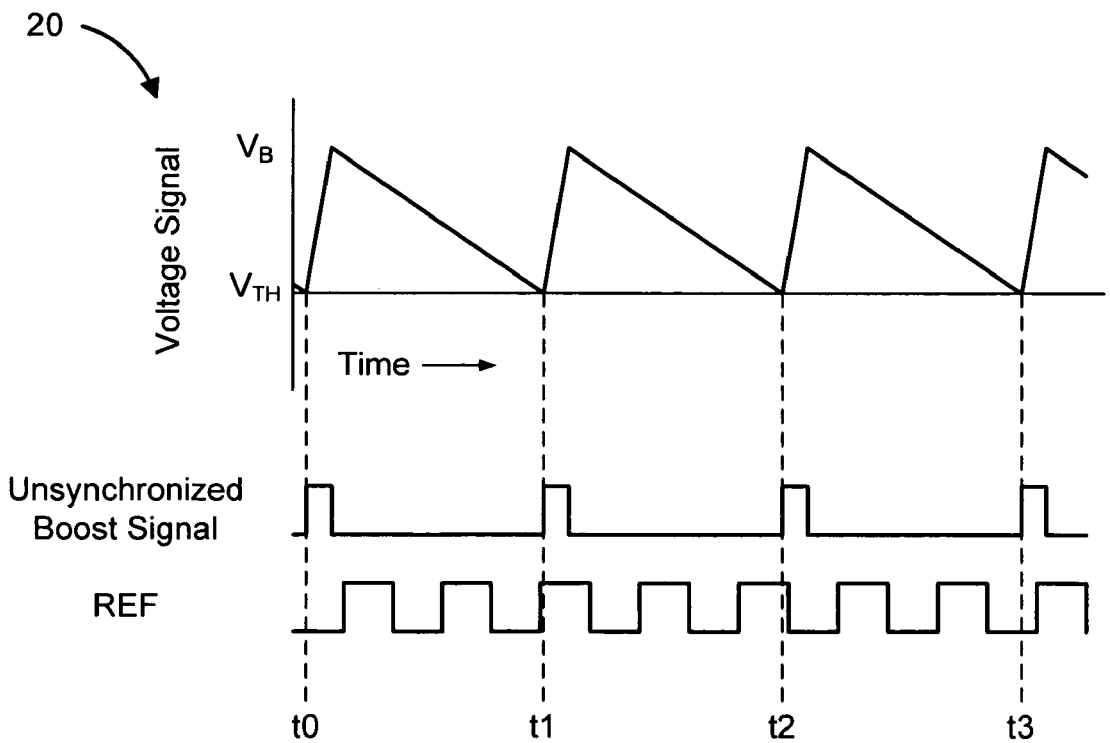
FIG. 2 illustrates a conventional boost system timing diagram.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Embodiments of a method and apparatus are described to synchronize a boost signal. In one embodiment, the boost signal is synchronized with an external reference signal such as a clock signal. In another embodiment, the boost signal is synchronized with a reference signal that is internal to the circuit which is supplied with the synchronized boost signal. By synchronizing the boost signal with an internal reference signal such as a PLL signal, the boost signal may be prevented from occurring during a rising edge of the clock signal for the circuit.

Certain embodiments of the method, apparatus, and system described above offer advantages, compared to conventional technologies. In some embodiments, production costs may be reduced because no additional headroom or internal supply regulation is implemented. Also, no additional analysis is performed to quantify the impact of a specific supply spike. In some embodiments, supply spikes due to boosting are not present. Other advantages may be described in or implied from the description provided herein.

One embodiment of the apparatus includes a boost circuit and a synchronization circuit. The synchronization circuit is coupled to the boost circuit. The boost circuit generates an unsynchronized boost signal to boost a voltage signal from a first voltage to a second voltage. The synchronization circuit synchronizes the unsynchronized boost signal with a reference signal to generate a synchronized boost signal.

In some embodiments, the apparatus also includes a phase-locked loop (PLL) coupled to the synchronization circuit. The PLL may generate the reference signal. In some embodiments, the boost circuit and the PLL are internal to a circuit configured to receive the synchronized boost signal.

In some embodiments, the apparatus also includes a clock circuit coupled to the synchronization circuit. The clock circuit may generate the reference signal. In some embodiments, the clock circuit is external to a circuit configured to receive the synchronized boost signal.

In some embodiments, the synchronization circuit is further configured to synchronize a rising edge of the unsynchronized boost signal with a falling edge of the reference signal. In some embodiments, the synchronization circuit includes a clock input to receive a clock signal as a reference signal, a boost input to receive the unsynchronized boost signal, and a boost output to output the synchronized boost signal. In some embodiments, the synchronization circuit is configured to delay the unsynchronized boost signal until after a rising edge of the clock signal and before a subsequent rising edge of the clock signal.

In some embodiments, the apparatus is a peripheral device of a computer system. As a peripheral device, the apparatus may be coupled to the computer system via a universal serial bus (USB) port.

Another embodiment of the apparatus includes means for generating an unsynchronized boost signal to boost a voltage signal from a first voltage to a second voltage, and means for increasing immunity of a circuit to supply spike noise related to the unsynchronized boost signal. The apparatus also may include means for synchronizing the unsynchronized boost signal with a reference signal to generate a synchronized boost signal. In some embodiments, the apparatus also includes means for generating a synchronized boost signal from the unsynchronized boost signal and a reference signal approximately when the voltage signal decreases beyond a threshold voltage and the reference signal exhibits a falling edge. In some embodiments, the apparatus also includes means for delaying the unsynchronized boost signal until after a critical event of the circuit. The apparatus also may include means for reducing noise coupling into a filter coupled to the circuit. Other embodiments of the apparatus are also described.

A method is also described. In one embodiment, the method includes generating an unsynchronized boost signal to boost a voltage signal from a first voltage to a second voltage, synchronizing the unsynchronized boost signal with a reference signal to generate a synchronized boost signal, and supplying the synchronized boost signal to a circuit.

In some embodiments, synchronizing the unsynchronized boost signal comprises synchronizing the unsynchronized boost signal with a signal characteristic of the reference signal. In some embodiments, the signal characteristic of the reference signal occurs at a time other than during a critical event. In some embodiments, the critical event is a rising clock edge of the reference signal. Where the reference signal is a PLL signal, the signal characteristic of the PLL signal may be a falling clock edge. Other embodiments of the method are also described.

Figure 3:
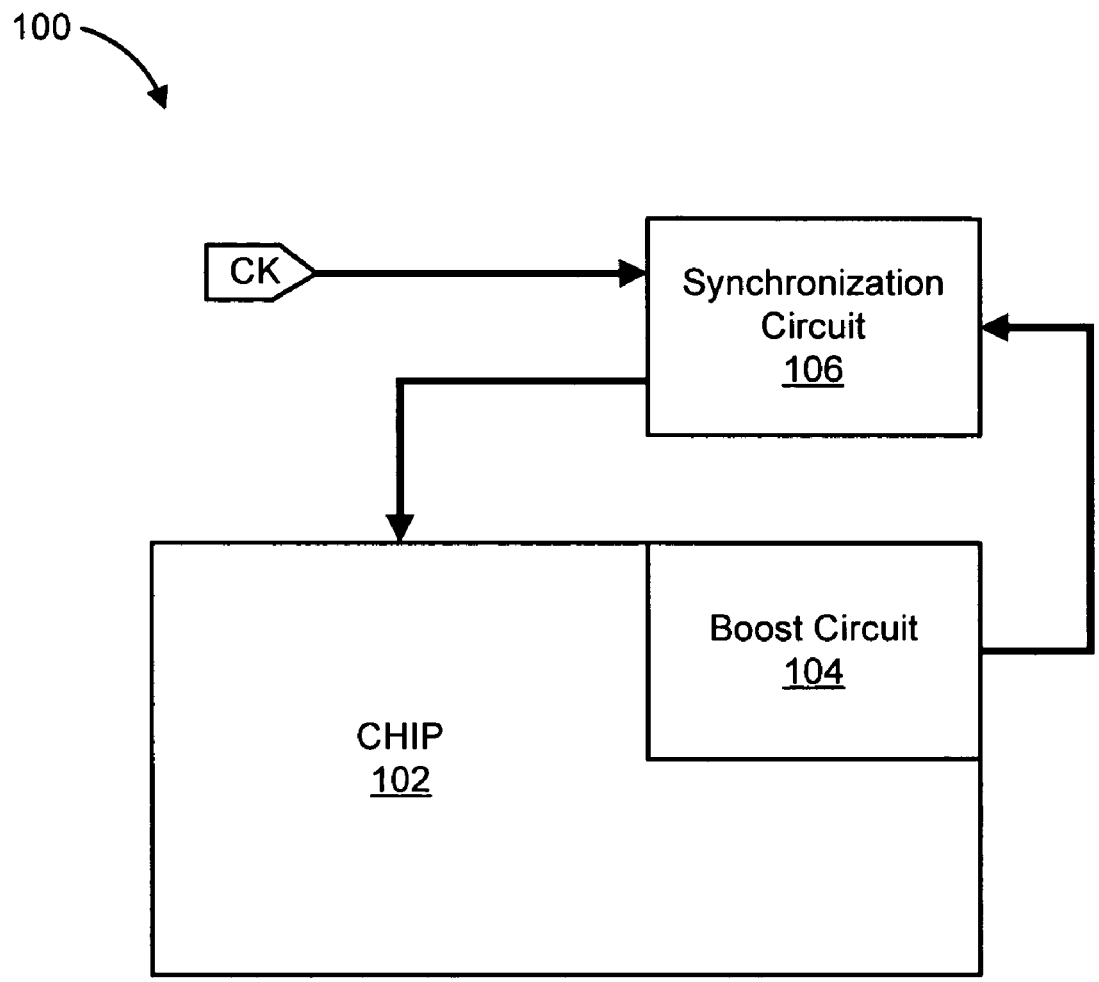
FIG. 3 illustrates one embodiment of a synchronization system to synchronize a boost signal using an external clock.

FIG. 3 illustrates one embodiment of a synchronization system 100 to synchronize a boost signal using an external clock. The depicted synchronization system 100 includes a chip 102, a boost circuit 104, and a synchronization circuit 106. Boost circuits are well-known, so details of the boost circuit 104 are not shown in FIG. 3. However, a brief description is provided below to describe one embodiment of a boost circuit 104. Alternatively, other embodiments may be implemented in the synchronization system 100.

One embodiment of a boost circuit 104 includes an input coupled to an inductor in series with a diode, which is coupled to an output. A switch is coupled between ground and the node between the inductor and the diode. A capacitor is coupled between ground and the node between the diode and the output. The boost circuit 104 is controlled by controlling when the switch is opened and closed. Assuming the switch has been open for a long time, the output voltage (i.e., the voltage across the capacitor) is the same as the input voltage. When the switch closes, the diode prevents the capacitor from discharging to ground, and the current through the inductor rises linearly with time at a rate proportional to the input voltage divided by the inductance. When the switch opens again, the inductor current continues to flow through the diode to the output, and the slope (i.e., di/dt) of the current through the inductor reverses as the output voltage rises. In this way, the output voltage rises until equilibrium is reached. The switch continues to open and close in this manner to maintain the output voltage above a predetermined threshold voltage, $V_{TH}$.

The synchronization circuit 106 is coupled to the boost circuit 104 to receive the unsynchronized boost signal. In some embodiments, the synchronization circuit 106 is located off of the chip 102. Alternatively, the synchronization circuit 106 may be located on the chip 102. One example of the synchronization circuit 106 is shown and described in more detail with reference to FIG. 8. The synchronization circuit 106 also receives an external clock signal as a second input. The synchronization circuit 106 outputs a synchronized boost signal to the chip 102 so that the boosted voltage signal is not increased at the time of a critical event such as a rising clock edge of the clock signal on the chip 102.

Although using an external clock signal as an input to the synchronization circuit 106 may not solve all of the problems associated with using a boost signal, implementing the synchronization circuit 106 with an external clock signal as an input may facilitate avoiding specific frequency spurs (i.e., noise). Compared to a conventional boost circuit 14, which generates a boost signal whenever the voltage signal falls below the threshold voltage, $V_{TH}$, the depicted synchronization circuit 106 delays the generated boost signal until the external clock manifests, for example, a rising clock edge. In this manner, the synchronization system 100 only boosts the voltage signal when the voltage signal drops below some threshold (e.g., $V_{TH}$) and the clock signal manifests a predetermined signal characteristic (e.g., a rising clock edge).

Figure 4:
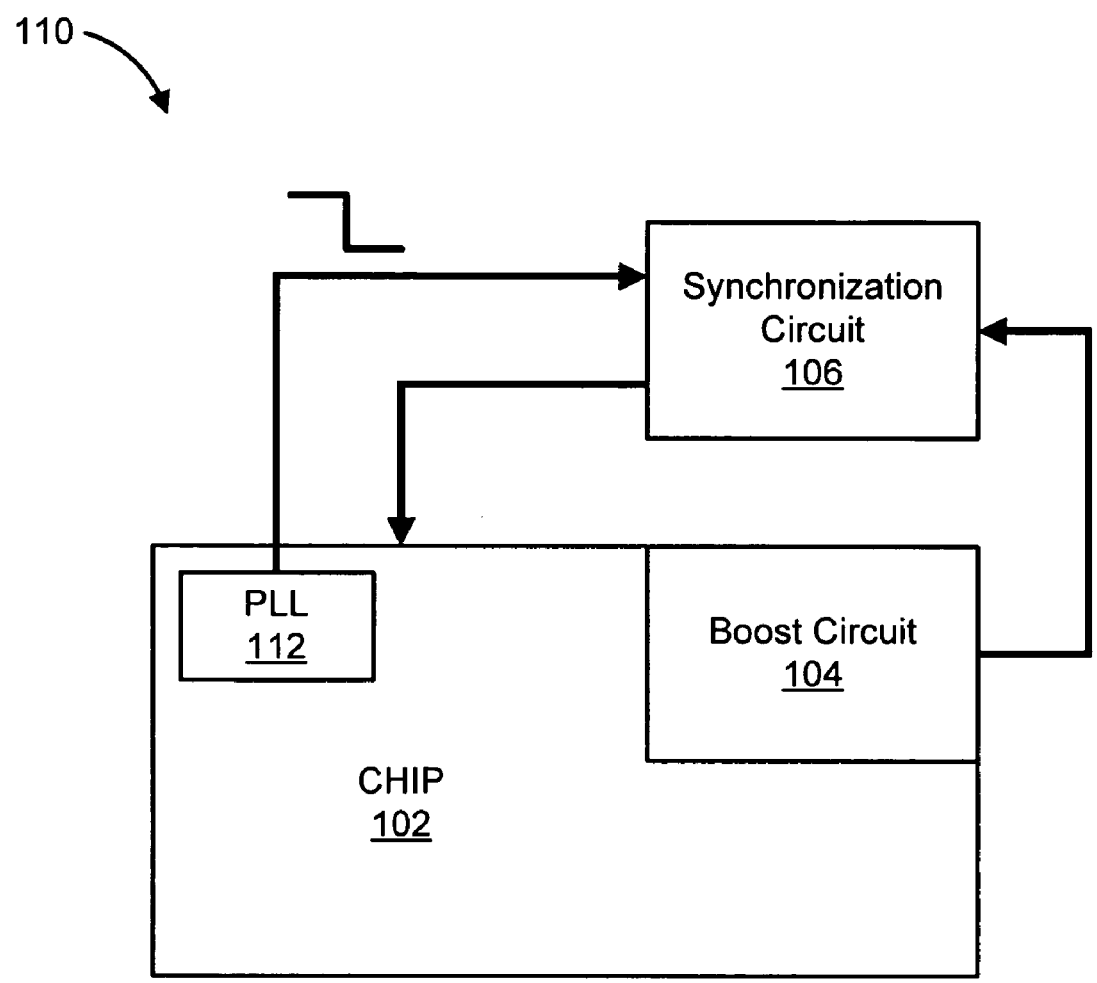
FIG. 4 illustrates another embodiment of a synchronization system to synchronize a boost signal using an internal phase-locked loop (PLL).

FIG. 4 illustrates another embodiment of a synchronization system 110 to synchronize a boost signal using an internal phase-locked loop (PLL) 112. In particular, the synchronization circuit 106 synchronizes the boost signal to a reference signal from the internal PLL 112, rather than to an external clock signal. Alternatively, the PLL 112 may be external to the chip 102.

As explained above, a conventional boost circuit 14 generates an unsynchronized boost signal whenever the supply voltage signal drops below some threshold voltage. In contrast, the depicted synchronization system 110 generates a synchronized boost signal when the voltage signal falls below the threshold voltage and there is a predetermined signal characteristic of the reference signal from the PLL 112. In one embodiment, the signal characteristic of the reference signal is a falling clock edge. Alternatively, other signal characteristics may be used. By synchronizing the reference signal of the PLL 112 to the clock signal on the chip 102, and synchronizing the boost signal to a falling edge of the reference signal of the PLL 112, the boost signal does not coincide with a rising edge of the clock signal on the chip 12. Thus, the boost signal does not interfere with a critical event such as the rising clock edge. Therefore, even if the boost signal causes supply spikes, the generated spikes or other noise are not present during a critical event.

Figure 5:
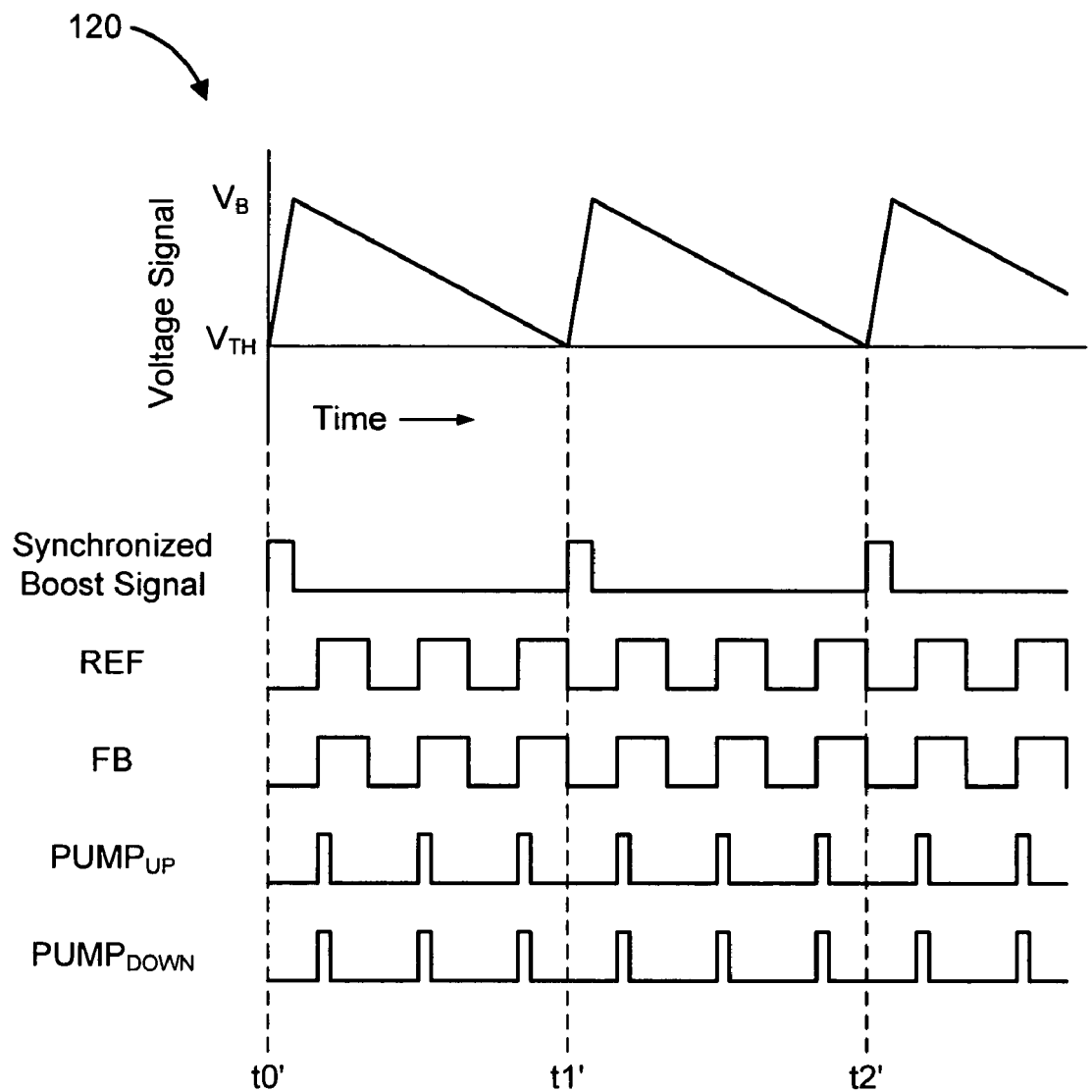
FIG. 5 illustrates one embodiment of a timing diagram corresponding to the synchronization system of FIG. 4.

FIG. 5 illustrates one embodiment of a timing diagram 120 corresponding to the synchronization system 110 of FIG. 4. The depicted timing diagram 120 shows the voltage signal periodically dropping to a threshold voltage, $V_{TH}$, and then being boosted to a boost voltage, $V_B$. The timing diagram 120 also shows a reference signal, REF, a feedback signal, FB, a pump-up signal $PUMP_{UP}$, and a pump-down signal, $PUMP_{DOWN}$. These signals relate to the operation of the PLL 112 and are well-known. More detailed examples of the PLL 112 are shown and described in more detail with reference to FIGS. 6 and 7.

The voltage signal is boosted each time the voltage signal reaches the threshold voltage and the reference voltage exhibits, for example, a falling clock edge. In the illustrated embodiment, the synchronization circuit 106 generates synchronized boost signals at times t0', t1', and t2'. Because the boost signals are synchronized, the boost signals do not occur, and the voltage signal is not boosted, at approximately the same time as a rising edge of the reference signal. Thus, the implementation of the synchronization circuit 106 prevents the negative effects associated with the noise from the boosting process because the boost signals are delayed so that they do not occur at the same time as the critical internal edge. In one embodiment, boosting takes place when the charge pump is tri-stated. When the charge pump is active (on rising edge), the boosting is delayed.

In one embodiment, the threshold voltage may be redefined to a slightly higher voltage than in a conventional boost circuit 10. Redefining the threshold voltage may prevent the voltage signal from falling below the conventional threshold. For example, if the voltage signal takes slightly more time than an equivalent integral number of clock cycles to fall below the threshold voltage, then the voltage signal could potentially drop below the conventional threshold voltage for almost one clock cycle. To address this potential issue, the threshold voltage may be redefined so that if the voltage signal continues to drop over one additional clock cycle, then the resulting voltage signal would still be above a conventional voltage threshold.

Figure 6:
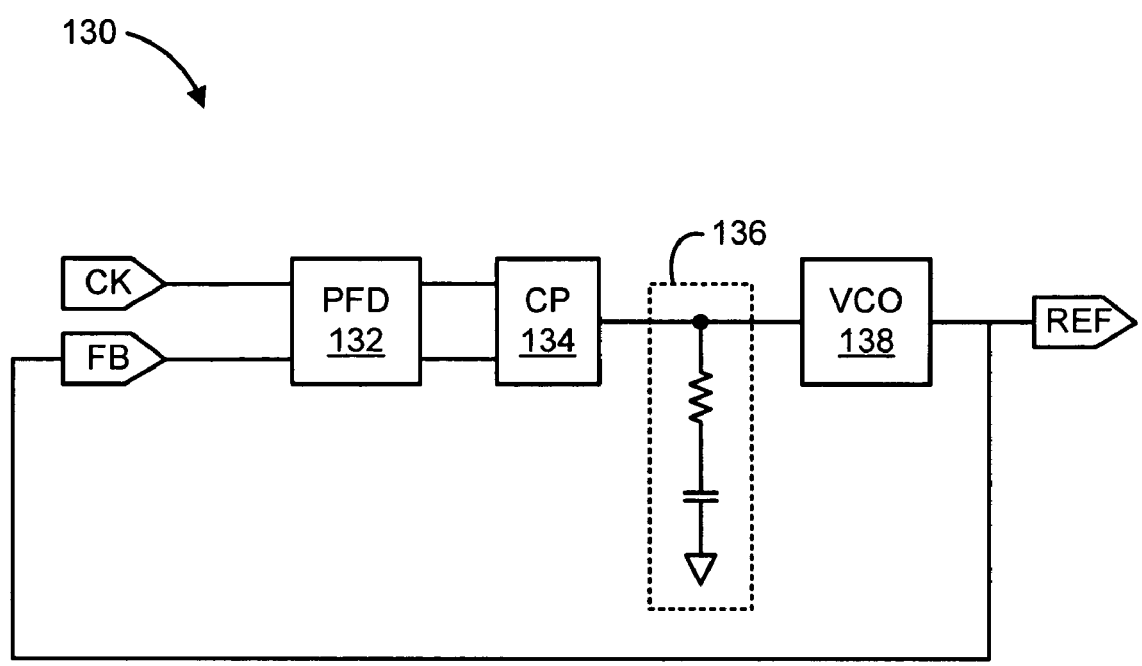
FIG. 6 illustrates one embodiment of a PLL.

FIG. 6 illustrates one embodiment of a PLL 130. The depicted PLL 130 is one implementation of the PLL 112 of the synchronization system 110 of FIG. 4. The main components of the PLL 130 are a phase frequency detector (PFD) 132, a charge pump (CP) 134, a loop filter 136, and a voltage controlled oscillator (VCO) 138. In one embodiment, the loop filter 136 includes a series combination of a resistor and a capacitor coupled to ground. Other embodiments of the filter 136 or PLL 130 may include other components.

The PFD 132 receives a reference clock signal (CK) and a feedback clock signal (FB) as inputs. In general, the PFD 132 detects a difference in phase and frequency, if any, between the reference clock signal and the feedback clock signal. If a difference is detected, the PFD 132 generates a control signal based on whether the feedback frequency is lagging or leading the reference clock signal. The PFD 132 outputs the control signal to the CP 134, which drives or draws current from the loop filter 136 based on the control signal. The loop filter 136 converts these signals to a control voltage that is used to bias the VCO 138. Based on the control voltage, the VCO 138 oscillates at a higher or lower frequency, which affects the phase and frequency of the feedback clock signal. When the reference clock signal and the feedback clock signal are aligned, the PLL 130 is considered locked.

Because the frequency of the reference clock signal may vary over time, differences between the reference clock signal and the output clock signal (REF) of the VCO 138 are provided as feedback to the PFD 132 and used to lock the frequency of the output clock signal to the reference clock signal. If, for example, the frequency of the reference clock signal shifts slightly, the phase difference between the output clock signal and the reference clock signal will begin to increase with time. This changes the control voltage on the VCO 138 in such a way as to bring the VCO frequency back to the value of the reference clock signal. Thus, the PLL 130 may maintain the lock when the reference clock signal frequency varies. Some applications such as high-performance applications benefit from a relatively quick phase lock.

Figure 7:
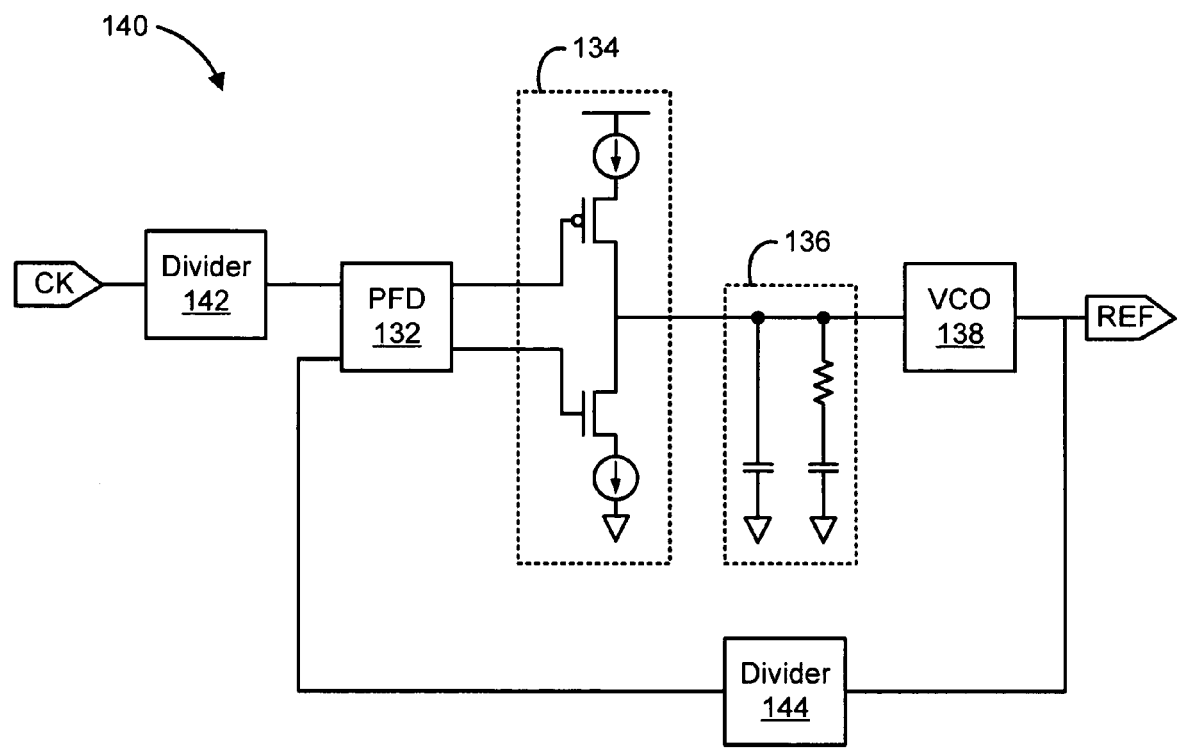
FIG. 7 illustrates another embodiment of a PLL.

FIG. 7 illustrates another embodiment of a PLL 140. The depicted PLL 140 is another implementation of the PLL 112 of the synchronization system 110 of FIG. 4. The main components of the PLL 140 are substantially similar to the components of the PLL 130 described above (e.g., a PFD 132, a CP 134, a loop filter 136, and a VCO 138), although some additional schematic details are provided as alternative embodiments for the CP 134 and the loop filter 136. The PLL 140 also includes dividers 142 and 144, which are well-known and not described in more detail. In many aspects, the PLL 140 operates in substantially the same manner as the PLL 130 of FIG. 6.

Figure 8:
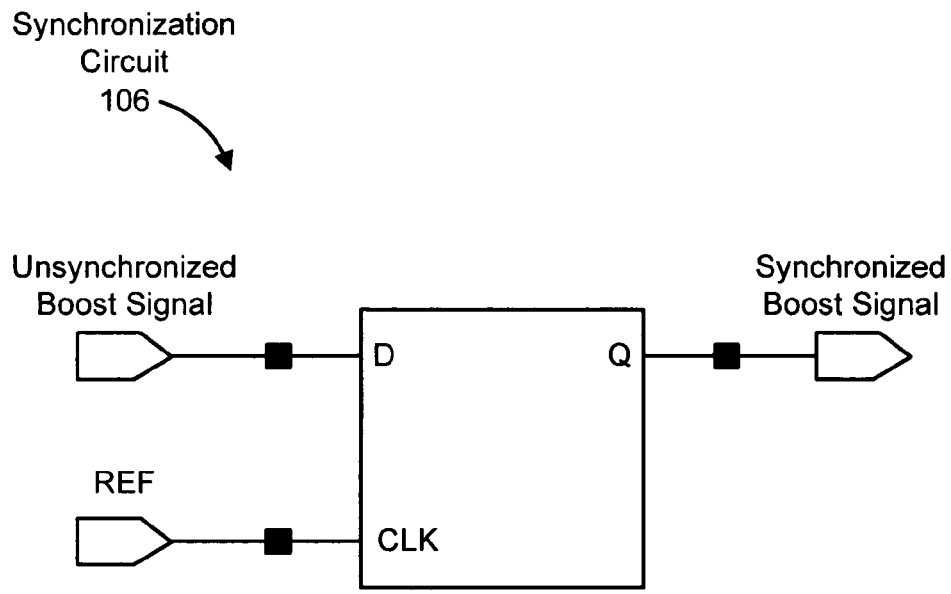
FIG. 8 illustrates one embodiment of a synchronization circuit.

FIG. 8 illustrates one embodiment of a synchronization circuit 106. As an example, the synchronization circuit 106 may be implemented using the WirelessUSB™ LP 2.4 GHz Radio System-on-a-Chip (SoC) (see datasheet CYRF6936) from Cypress Semiconductor of San Jose, Calif. As described above, the synchronization circuit 106 may be implemented in the synchronization systems 100 or 110. In one embodiment, the synchronization circuit 106 includes two inputs. The unsynchronized boost signal from the boost circuit 104 is received as a first input, and the reference signal (e.g., an external clock signal, or an output clock signal from an internal PLL 112) is received as a second input. The synchronization circuit 106 outputs the synchronized boost signal which is synchronized with a signal characteristic of the reference signal. As one example, the synchronized boost signal may be synchronized with a falling edge of the reference signal. Alternatively, the synchronized boost signal may be synchronized with another signal characteristic of the reference signal.

Figure 9:
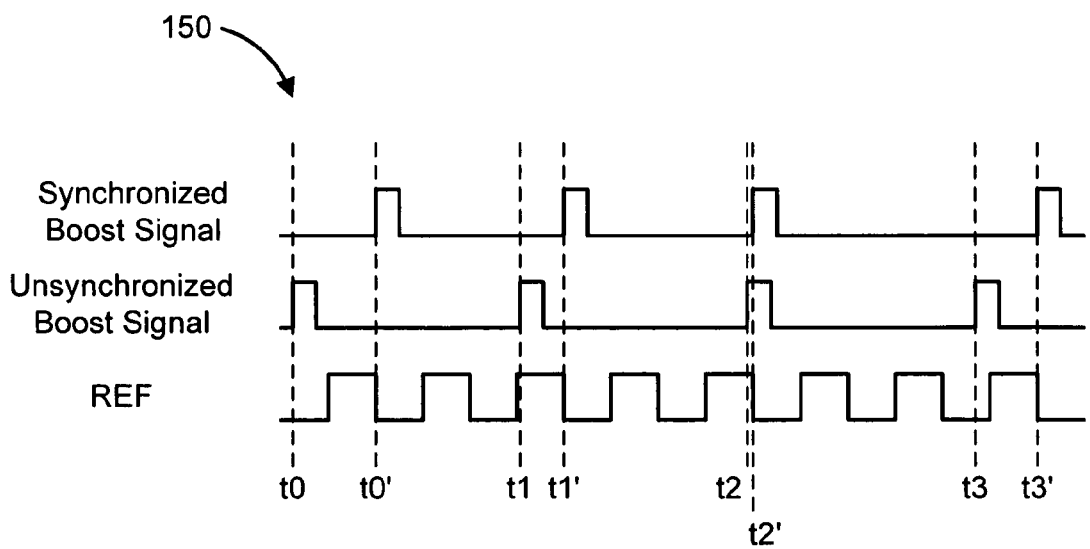
FIG. 9 illustrates one embodiment of a synchronization circuit timing diagram.

FIG. 9 illustrates one embodiment of a synchronization circuit timing diagram 150. The synchronization circuit timing diagram 150 shows the reference signal, the unsynchronized boost signal, and the synchronized boost signal. Without synchronization, the boost signal would occur, and the voltage signal would be boosted, at times t0, t1, t2, and t3. The disadvantages and potential negative effects of unsynchronized boost signals are described above. In contrast, the synchronized boost signals occur at times t0', t1', t2', and t3', which are synchronized with the falling edges of the reference signal. The timing diagram 150 portrays the potential delay between the unsynchronized boost signal pulses and the corresponding synchronized boost signal pulses. In some instances, the delay may be minimal such as between t2 and t2'. However, in other instances, the delay may be up to one full clock cycle. In any case, the synchronization circuit 106 introduces the delay so that the boost signal does not interfere with critical events such as the rising edge of the clock signal on the chip 102.

Figure 10:
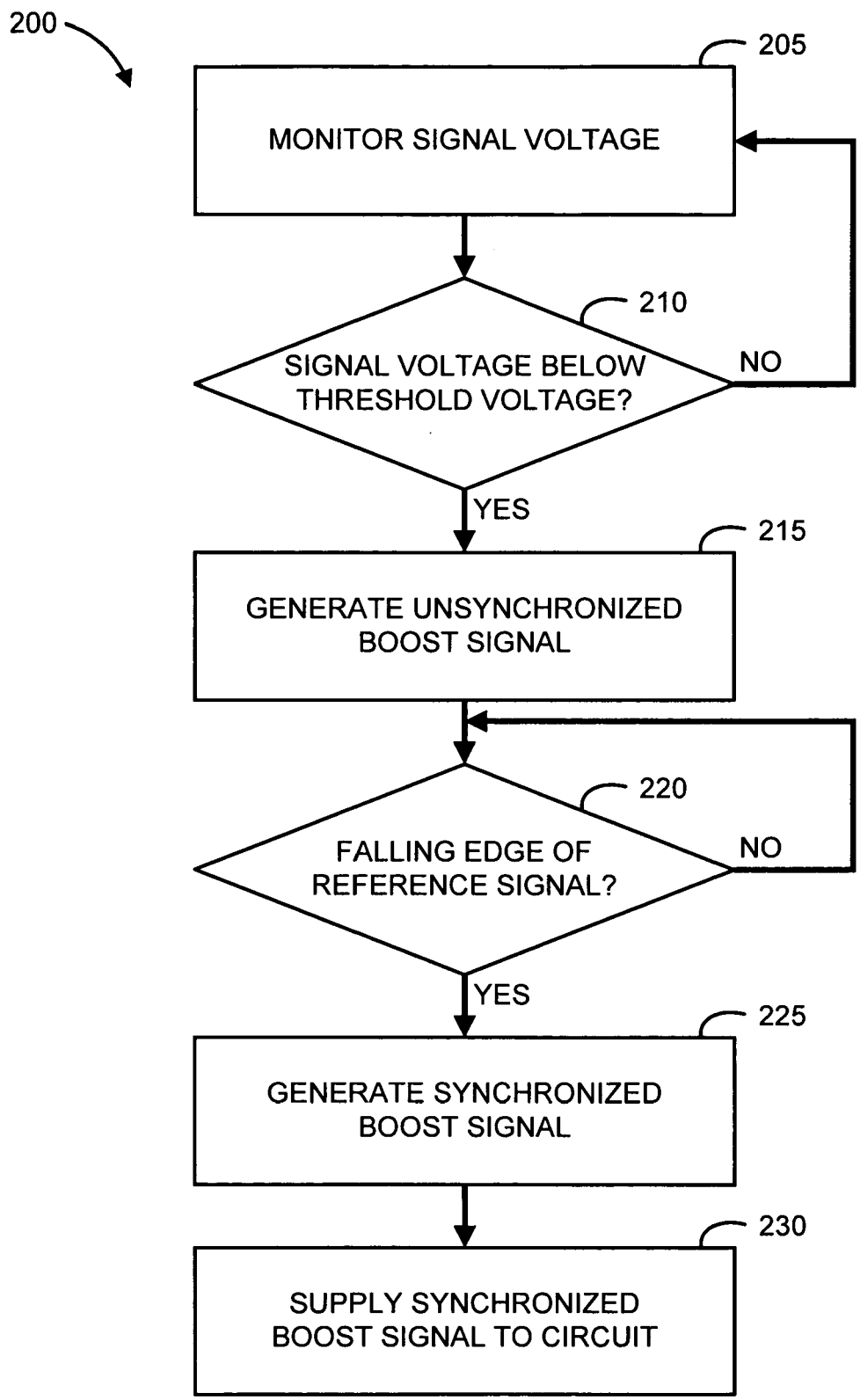
FIG. 10 illustrates one embodiment of a synchronization method which may be implemented in conjunction with the synchronization circuit of FIG. 8.

FIG. 10 illustrates one embodiment of a synchronization method 200 which may be implemented in conjunction with the synchronization circuit 106 of FIG. 9. Although certain operations are shown in FIG. 9, other embodiments of the synchronization method 200 may include fewer or more operations.

In one embodiment, the synchronization method 200 monitors 205 the voltage signal to determine 210 if the voltage signal decreases to or falls below the threshold voltage. If the voltage is not at or below the threshold voltage, then the boost circuit 104 and synchronization circuit 106 may remain inactive. Once the voltage signal reaches or falls below the threshold voltage, the boost circuit 104 may generate 215 an unsynchronized boost signal, as described above.

Meanwhile, the synchronization circuit 106 determines 220 if there is a falling edge of the reference signal. The reference signal may originate from a source that is external or internal to the chip 102. If the reference signal does not exhibit a falling edge, then the synchronization circuit 106 continues to monitor for a falling edge. Once the synchronization circuit 106 detects a falling edge of the reference signal, the synchronization circuit 106 generates 225 a synchronized boost signal. The synchronization circuit 106 then supplies 230 the synchronized boost signal to the chip 102. The depicted synchronization method 200 then ends.

Embodiments of the present invention include various operations, which are described herein. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing device(s) described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing device(s) and special-purpose processing device(s).

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
generating an unsynchronized boost signal to boost a voltage signal from a first voltage to a second voltage;
synchronizing the unsynchronized boost signal with a reference signal to generate a synchronized boost signal; and
supplying the synchronized boost signal to a circuit.

2. The method of claim 1, wherein the reference signal comprises a phase-locked loop (PLL) signal from a PLL internal to the circuit.

3. The method of claim 2, wherein synchronizing the unsynchronized boost signal comprises delaying the unsynchronized boost signal to coincide with a signal characteristic of the PLL signal.

4. The method of claim 3, wherein the signal characteristic of the PLL signal is a falling clock edge.

5. The method of claim 1, wherein synchronizing the unsynchronized boost signal comprises synchronizing the unsynchronized boost signal with a signal characteristic of the reference signal.

6. The method of claim 5, wherein the signal characteristic of the reference signal occurs at a time other than during a critical event.

7. The method of claim 6, wherein the critical event comprises a rising clock edge of the reference signal.

8. An apparatus, comprising:
a boost circuit to generate an unsynchronized boost signal to boost a voltage signal from a first voltage to a second voltage; and
a synchronization circuit coupled to the boost circuit, the synchronization circuit to synchronize the unsynchronized boost signal with a reference signal to generate a synchronized boost signal.

9. The apparatus of claim 8, further comprising a phase-locked loop (PLL) coupled to the synchronization circuit, the PLL to generate the reference signal.

10. The apparatus of claim 9, wherein the boost circuit and the PLL are internal to a circuit configured to receive the synchronized boost signal.

11. The apparatus of claim 8, further comprising a clock circuit coupled to the synchronization circuit, the clock circuit to generate the reference signal.

12. The apparatus of claim 11, wherein the clock circuit is external to a circuit configured to receive the synchronized boost signal.

13. The apparatus of claim 8, wherein the synchronization circuit is further configured to synchronize a rising edge of the unsynchronized boost signal with a falling edge of the reference signal.

14. The apparatus of claim 8, wherein the synchronization circuit comprises:
- a clock input to receive a clock signal, wherein the clock signal is the reference signal;
- a boost input to receive the unsynchronized boost signal; and
- a boost output to output the synchronized boost signal, wherein the synchronization circuit is configured to delay the unsynchronized boost signal until after a rising edge of the clock signal and before a subsequent rising edge of the clock signal.

15. The apparatus of claim 8, wherein the apparatus comprises a peripheral device of a computer system, the peripheral device coupled to the computer system via a universal serial bus (USB) port.

16. An apparatus, comprising:
- means for generating an unsynchronized boost signal to boost a voltage signal from a first voltage to a second voltage;
- means for increasing immunity of a circuit to supply spike noise related to the unsynchronized boost signal; and
- means for synchronizing the unsynchronized boost signal with a reference signal to generate a synchronized boost signal.

17. An apparatus, comprising:
- means for generating an unsynchronized boost signal to boost a voltage signal from a first voltage to a second voltage;
- means for increasing immunity of a circuit to supply spike noise related to the unsynchronized boost signal; and
- means for generating a synchronized boost signal from the unsynchronized boost signal and a reference signal approximately when the voltage signal decreases beyond a threshold voltage and the reference signal exhibits a falling edge.

18. An apparatus, comprising:
- means for generating an unsynchronized boost signal to boost a voltage signal from a first voltage to a second voltage;
- means for increasing immunity of a circuit to supply spike noise related to the unsynchronized boost signal; and
- means for delaying the unsynchronized boost signal until after a critical event of the circuit.

19. The apparatus of claim 18, further comprising means for reducing noise coupling into a filter coupled to the circuit.

* * * * *